United States
Borden, Jr.

[11] 3,748,018
[45] July 24, 1973

[54] UNIVERSAL TRANSMISSION REFLECTANCE MODE LIQUID CRYSTAL DISPLAY

[75] Inventor: Howard C. Borden, Jr., Atherton, Calif.

[73] Assignee: American Micro-Systems, Inc., Santa Ana, Calif.

[22] Filed: Feb. 9, 1972

[21] Appl. No.: 224,684

[52] U.S. Cl............................ 350/160 LC, 40/130 C
[51] Int. Cl................................................. G02f 1/16
[58] Field of Search........................... 350/160 LC; 40/130 C, 133 R

[56] References Cited
UNITED STATES PATENTS

| | | | |
|---|---|---|---|
| 736,722 | 8/1903 | Hall | 40/133 R |
| 1,769,824 | 7/1930 | Burns | 40/130 C |
| 3,499,112 | 3/1970 | Heilmeier et al. | 350/160 LC |
| 3,575,491 | 4/1971 | Heilmeier | 350/160 LC |
| 3,674,341 | 7/1972 | Hedman, Jr. et al. | 350/160 LC |

*Primary Examiner*—Edward S. Bauer
*Attorney*—Roger W. Erickson

[57] ABSTRACT

A liquid crystal display is operable in transmission or reflection modes to provide a high level of readability over a range of ambient light extending from total darkness to full sunlight illumination. Liquid crystal material is confined between front and rear spaced apart transparent plates provided with inner surfaces having conductive coatings formed in predetermined display patterns. The rear plate is coated with one or more layers of material that provide for the transmission of light through it and also for the reflection of ambient light directed through the front of the display. A back illumination light is provided behind the rear plate which is energized either manually or automatically when the ambient light level in front of the display falls below a predetermined level.

6 Claims, 7 Drawing Figures

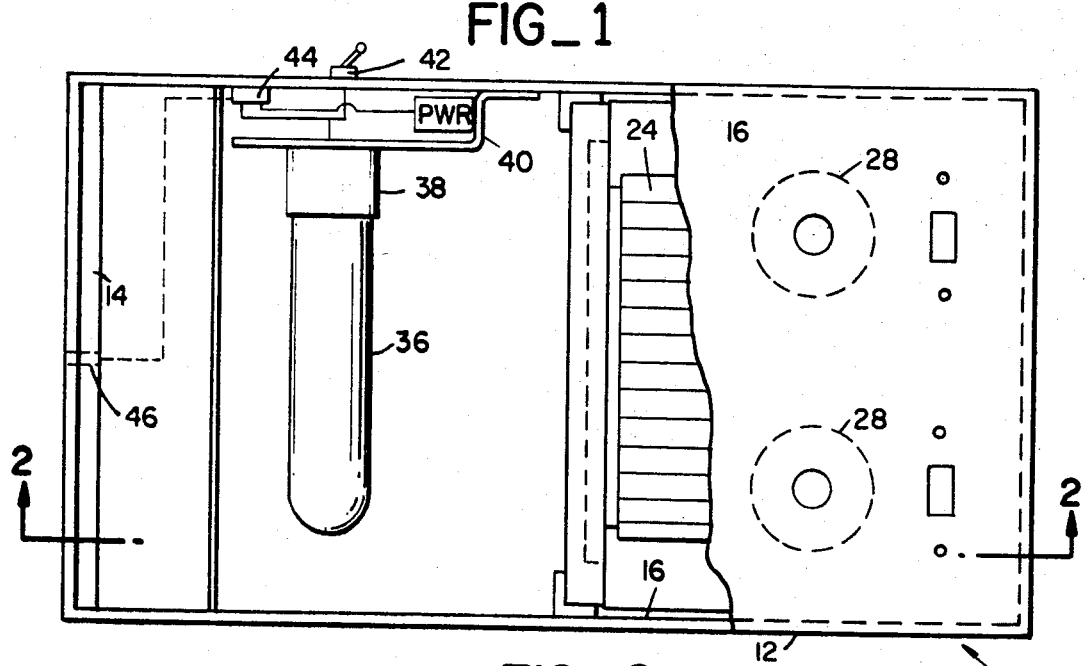
FIG_1
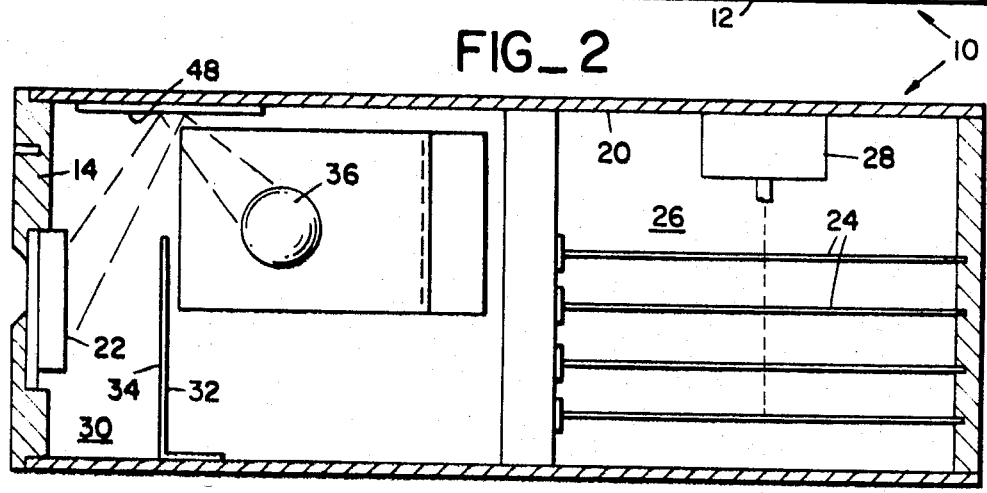
FIG_2
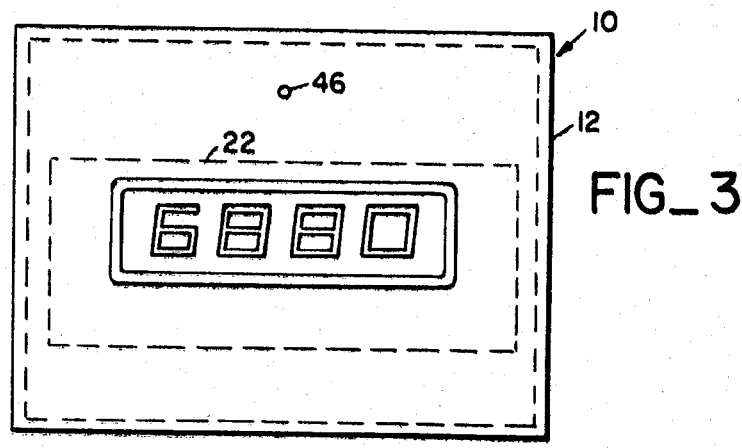
FIG_3

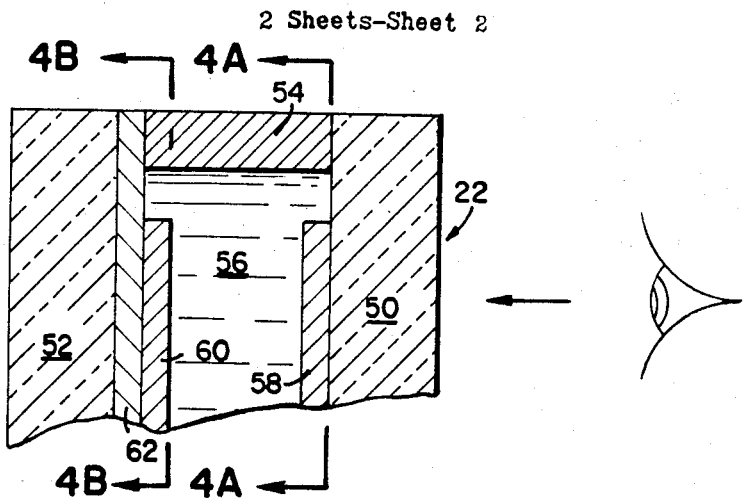
FIG_4
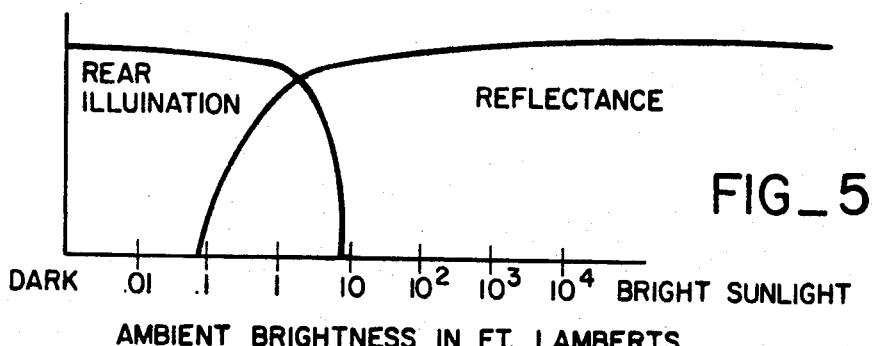
FIG_5
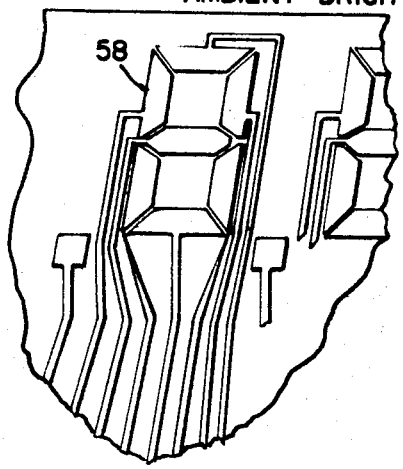
FIG_4A
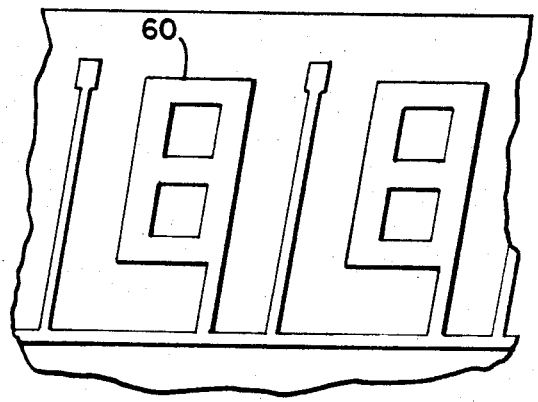
FIG_4B

UNIVERSAL TRANSMISSION REFLECTANCE MODE LIQUID CRYSTAL DISPLAY

BACKGROUND OF THE INVENTION

Liquid crystal devices have a wide range of utility ranging from readout devices for electronic calculating and measuring apparatus to clocks and a wide variety of other forms of displays, signs or indicators. However, with such devices as heretofore devised, the readability factor diminished to an unacceptable level as ambient light also diminished. This limitation prevented liquid crystal displays from being used for such applications as highway signs which must operate with high readability at night as well as in daylight.

It is therefore one object of the present invention to solve the aforesaid problem by providing a display device that will afford a high level of readability for a wide range of ambient light level from total darkness to full sunlight.

Another object of my invention is to provide a liquid crystal display unit that can be easily read in either total darkness or bright sunlight and which is relatively simple and thus economical to manufacture.

Yet another object of my invention is to provide a liquid crystal display unit that will use a relatively small amount of operating power and can be constructed in a wide range of display character sizes to accommodate many different applications.

A more specific object of my invention is to provide a liquid crystal display device having a rear transparent plate that will allow light to be transmitted through it from a back light source located rearwardly of the device when ambient light is low and yet a plate having a coating that will reflect ambient light to increase the readability of the display when the back light source is not on.

Still another object is to provide a liquid crystal display device that will operate automatically to energize a back light source that will transmit light through the rear side of the device when ambient light decreases below a predetermined level.

Other objects, advantages and features of the invention will become apparent from the following detailed description presented in conjunction with the drawing.

SUMMARY OF THE INVENTION

In broad terms, a display device according to my invention comprises a pair of front and rear glass plates which are spaced apart and sealed around their edges to form a chamber containing liquid crystal material. The front plate has a conductive coating formed in a predetermined pattern of characters or symbols. On the rear plate is a similar coating of conductive material which covers areas aligned with the symbol areas on the front plate. Between the latter conductive coating and the surface of the rear plate is a dielectric layer or coating of reflective material which will also transmit light. Behind the rear plate of the display unit is a controllable light source. When ambient light at the front of the display is above a certain level the light source is not energized, and the reflective material reflects light back through the liquid crystal material and through the front plate to enhance the contrast and thus the readability of the activated display characters. When the ambient light falls below the level of acceptable readability the light source is energized and is transmitted through the rear plate, the dielectric layer, the liquid crystal material and the front plate to provide the same contrast and readability as a high level of reflected ambient light. The control of the light source can be either manual or automatic.

FIG. 1 is a view in elevation and in section of a liquid crystal display unit embodying the principles of the present invention;

FIG. 2 is a top view in section of the display unit of FIG. 1;

FIG. 3 is a front view of the display unit of FIG. 1;

FIG. 4 is an enlarged fragmentary view of the display unit according to my invention;

FIG. 4A is a fragmentary view of the display unit taken along line 4A—4A of FIG. 4;

FIG. 4B is a fragmentary view of the display unit taken along line 4B—4B of FIG. 4; and FIG. 5 is a diagrammatic representation of the operating characteristics of my display unit.

With reference to the drawing, FIGS 1 - 3 show a liquid crystal display unit 10 which, in accordance with the principles of the present invention, will provide high readability in either a bright, well lighted environment or one of total darkness. In the form shown the unit comprises a housing 12 having a front frame portion 14, sidewalls 16 and connecting top and bottom sides 18 and 20. The front frame panel supports a liquid crystal display package 22 which is connected by conductive leads (not shown) to a series of control or driver circuits. These driver circuits may be comprised of semiconductor integrated circuit devices mounted on suitable rigid circuit boards 24 that may be installed with a rear compartment 26 of the housing as either plug-in or hard wired elements, in the well known manner. Connections to these circuit elements may be made through receptacles 28 located in the top of the rear compartment.

In a forward compartment 30 of the housing is a fixed planar element 32 which is spaced rearwardly from and parallel to the display package 22. This element has a black, non-reflective surface 34 so as to provide an opaque background and its top edge is substantially the same height as the display package. Rearward of this background element 32 is a controllable light source 36 such as an incandescent bulb. This bulb may be retained in a standard socket 38 mounted on a bracket 48 fixed to one side wall of the housing, the socket being connected through a simple on-off type of switch 42 to a power source (not shown). In parallel with this manual switch 42 is a second switch 44 automatically controlled by means of an ambient light sensor 46. The latter may be any suitable light sensor which can produce a signal proportional to the ambient light so that when the light level falls below a predetermined intensity the switch 44 will turn on the internal light source. Any suitable type of switch that is responsive to a signal from the light sensor may be employed. Fixed to the inside surface of the housing cover is a mirror 48 which is positioned so that when the light bulb is on, light will be reflected by the mirror and furnished to the rear of the display package.

From the foregoing it is seen that the present invention provides for the operation of the liquid crystal display 22 at a high level of readability in essentially two modes of operation which will now be explained further with respect to FIG. 4. Here, as shown in an enlarged cross sectional view, the display package comprises a front glass plate 50 and a rear glass plate 52 that are spaced apart and held together by a fluid tight peripheral seal 54. Thus, between the two main plates 50 and 52 is a narrow chamber within which is a quantity of liquid crystal material 56. On the inner surface of the front plate 50 is a first conductive layer 58 and a second conductive layer 60 is provided on the rear plate. One of these conductive layers is a pattern layer comprised of separate portions shaped to form character segments or whatever design or indicia is to be provided by the display package and having lead portions extending therefrom, as shown by example, in FIG. 4A. The other conductive layer is comprised of complementary conductive portions aligned with the pattern portions of the other conductive layer. Both of the conductive layers including each of the separate portions or segments of the pattern layer are connected by leads (not shown) to the driver and control circuitry on the boards 24. Between the second conductive coating 60 and the rear plate 52 is another ention, makes possible the two different modes of operation of the display unit 22. This layer is one that provides for either the transmission of light through or the reflection of light from the rear plate 52. The thickness of this layer 62 may vary, depending on the material used. Generally, it may be around 400 angstr'ms in thickness and it may be comprised of a single thin layer of a partially reflecting metal coating, such as aluminum which is properly electrically isolated so as not to interfere with proper electrical operation. Alternatively, the dual-mode material may be comprisd of one or more layers of dielectric materials such as titanium dioxide or calcium fluoride of around 1,000 angstroms in thickness.

In operation, the display unit 10 provides a high degree of readability when in either total darkness or in bright sunlight. This makes it particularly adaptable for use for such things as highway signs or other indicator or display devices that must operate day and night. For low light level or night time operation the light source 36 is on, and light furnished at the rear of the liquid crystal package 22 is transmitted through the rear plate 52 and also the dual mode coating 62 to illuminate the liquid crystal display material 56. This provides visible characters as observed in the normal transmission mode liquid crystal display. As the ambient light level increases, the back lighting provided by the bulb 36 is no longer needed, and the display then operates in the normal reflective mode. In this mode the ambient light is reflected from the dual mode layer 62 to illuminate the liquid crystal material. A qualitative representation of this dual mode operation is shown in FIG. 5, which illustrates how the readability level is maintained at a relatively high, near constant level in the full range of ambient light from darkness to bright sunlight. The dual mode layer 62 serves to enhance this constant readability by either allowing the transmission of light through the rear plate 52 or by reflecting light from it. The brightness of the display in the dark ambient light condition can be controlled by varying the intensity of the back illumination light using a rheostat with the switch 42. Actually, only a moderate amount of ambient light is required to produce the reflectance necessary for good readability. However, when this ambient light level gets low and there is inadequate contrast for interpretation of the display, the back illumination which can be energized either manually or automatically as described, restores usable contrast values to the display.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A liquid crystal display unit adapted to operate with high readability in ambient light ranging from total darkness to bright sunlight, said unit comprising:
   a housing having a front portion;
   a controllable light source within said housing rearward of said front portion;
   a liquid crystal display package mounted in said front portion of said housing, forward of said light source;
   said package including front and rear transparent plates spaced apart and sealed around their edges to frame a narrow chamber filled with liquid crystal material and a dual-mode layer of material on the inner surface of said rear plate for reflecting ambient light outside of said unit and for transmitting light from said light source when the ambient light is below a predetermined level.

2. The display unit of claim 1 including manual switch means for operating said light source.

3. The display unit of claim 1 including switch means connected to a power lead for said light source and an ambient light sensor mounted in said housing for actuating said switch means when the ambient light decreases to a predetermined level.

4. The display unit of claim 1 wherein said dual-mode layer is a partially reflecting metallic material.

5. The display unit of claim 4 wherein said dual-mode layer is a partially reflecting layer of aluminum having a thickness of around 400 angstroms.

6. The display unit of claim 4 wherein said dual-mode layer is a partially reflecting layer comprised of titanium dioxide having a thickness of around 1,000 angstroms.

* * * * *